Figure 1:
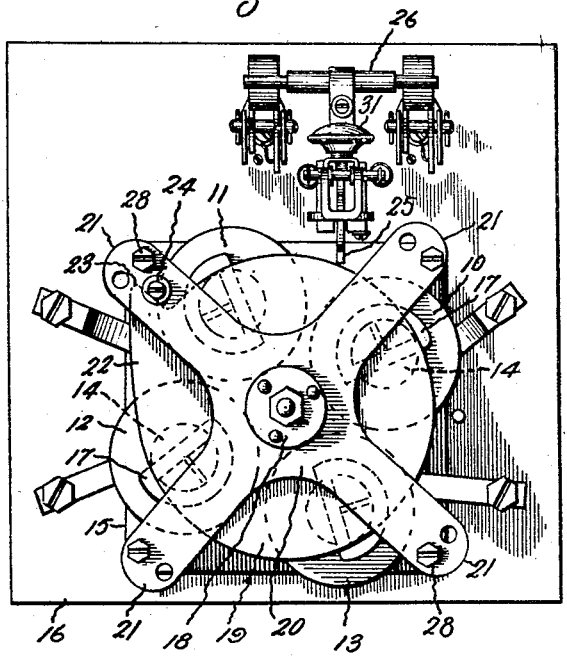

March 8, 1927.

B. W. JONES ET AL 1,620,555

ELECTROMAGNETIC DEVICE FOR ALTERNATING CURRENT CIRCUITS

Filed Nov. 12, 1921

Inventors:
Benjamin W. Jones,
Noble A Wolfe,
by Albert G. Davis
Their Attorney.

Patented Mar. 8, 1927.

1,620,555

UNITED STATES PATENT OFFICE.

BENJAMIN W. JONES AND NOBLE A. WOLFE, OF SCHENECTADY, NEW YORK, ASSIGNORS TO GENERAL ELECTRIC COMPANY, A CORPORATION OF NEW YORK.

ELECTROMAGNETIC DEVICE FOR ALTERNATING-CURRENT CIRCUITS.

Application filed November 12, 1921. Serial No. 514,568.

Our invention relates to electromagnetic devices for alternating current circuits and has for its object the provision of a device of this character which will operate on a polyphase circuit in one direction at various speeds or upon a single phase circuit in either a forward or reverse direction and at various speeds without change in the circuit connections.

While our invention is capable of general use as an electric motor, it is particularly useful for automatically disconnecting an electric motor or other translating device from a polyphase circuit upon the opening of one of the phases of the circuit. In another application, filed by Benjamin W. Jones, on the 12th day of November, 1921, Serial No. 514569, and assigned to the same assignee as this application, there is described and claimed a device of this general character. In the said application there is provided a device which will automatically disconnect an electric motor running on a polyphase circuit from its circuit in case of the opening of one or more phases of the polyphase circuit, or a phase reversal, either while the motor is running or standing still.

One of the important features of the device lies in the provision of a member in the form of a non-magnetic, metallic, disc which has a tendency to rotate in one direction when excited by polyphase current but, when one phase is opened, the member rotates in the opposite direction to operate a switch which opens the polyphase circuit. This is accomplished in the device of the application above referred to by means of a magnetic member secured to the disc, which is preferably of copper so as to be attracted by the magnets in opposition to the torque due to the rotating field. When the rotating field becomes zero or sufficiently reduced, the opposing torque due to the attraction of the magnets predominates, causing the disc to rotate in the opposite direction and open the main circuit.

In carrying out our invention we utilize the general principles of the application above referred to. We have found, however, that the utility of the device may be greatly increased and its operation improved by the provision of certain important features which we have invented. We have found, for instance, that by making the magnetic member stationary, the copper disc may be caused to rotate at different speeds, depending upon the position of the member. By the use of the magnetic member, a torque, in addition to the torque due to the rotating field, may be produced in the copper disc. This torque may be in either direction and of varying amount with relation to the rotating field torque. Furthermore, since this additional torque is independent of the rotating field, it will persist after the disappearance of the rotating field due, for instance, to the opening of one phase of the three-phase circuit. By adjusting the device so that the additional torque opposes the main torque, upon the opening of one phase the disc will rotate in the reverse direction and in doing so open the main circuit.

Figure 2:
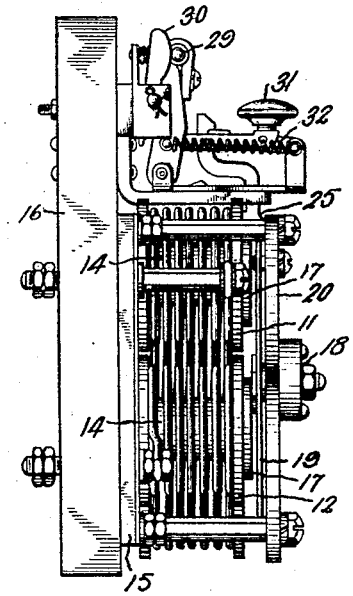
Figure 3:
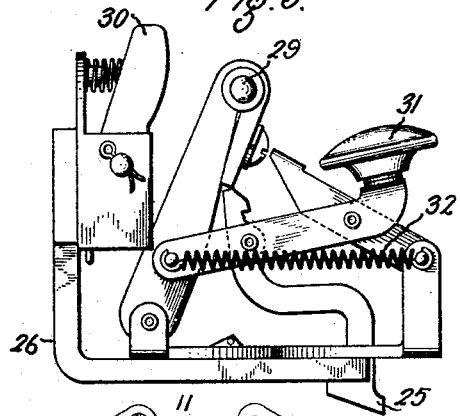
Figure 4:
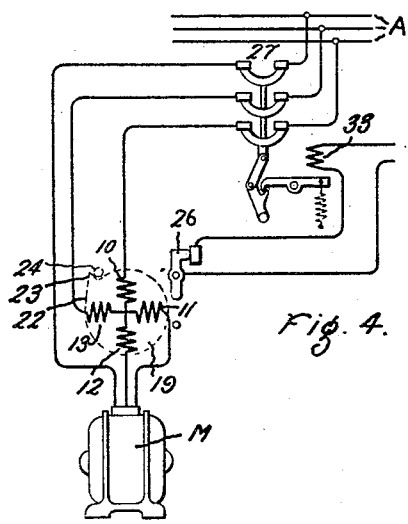
Figure 5:
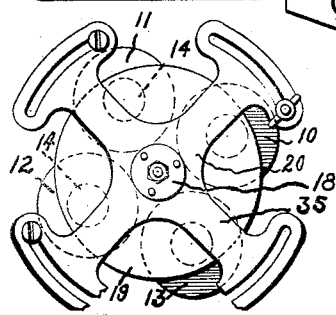

In the accompanying drawings illustrating one embodiment of our invention; Fig. 1 is a plan view of our improved device; Fig. 2 is a side view of the same; Fig. 3 shows a tripping switch for our device; Fig. 4 is a diagram of the circuit connections, and Fig. 5 shows a modification of our invention.

Referring to the drawings, it will be seen that we provide series windings for actuating the device. As shown, we provide four windings 10, 11, 12 and 13 which are connected in pairs in two phases of a three-phase circuit. Windings 10 and 12 are in series in one phase while windings 11 and 13 are in series in another phase. Referring to Figs. 1 and 2, it will be seen that these windings are provided with the usual magnetic cores 14 mounted on a magnetic base 15 which in turn is mounted upon insulating base 16. These cores are provided with copper rings 17 in their ends to form what is commonly known as "shading rings" for causing out of phase flux in a portion of the magnetic core. These "shading rings" improve the operation to some extent. The four windings are arranged symmetrically around a central axis 18 and a copper disc 19 is centrally mounted on said axis so as to be rotated by the rotating field set up by the four windings. This is a well known arrangement and forms no part of our present invention.

One of the important features of our invention resides in the provision of a magnetic member 20 cooperating with the four magnets to vary the effect of the flux of said magnets. This member is made, as shown, in the general form of a cross having four arms 21, arranged 90° apart, so as to be symmetrically arranged with respect to the coils. This magnetic member is normally stationary but may be adjusted on its center so as to vary the torque upon the copper disc 19. We have found that if this magnetic member 20 is displaced from a central position in which the magnetic arms which form the pole pieces are directly over the cores of the windings, that the flux from the magnet core to the magnetic arm sets up a torque in the copper disc, the direction and intensity of which will depend upon the direction which it is displaced and the amount of displacement. If, for instance, the magnetic member is displaced in the direction shown in Fig. 1, the torque in the copper disc due to such displacement will tend to rotate the disc in a counterclockwise direction, that is, the torque will be in the direction of the displacement. By adjusting the member toward or from the central position the torque will be decreased or increased between the limits of zero when the arms are directly over the magnets to a maximum when the arms are displaced a certain limit. We have found that this torque is independent of the rotating field due to the polyphase circuit, and is a torque due to the single phase flux of the individual magnets. The principle of operation is analogous to that produced by a shading ring and constitutes in effect an adjustable shading ring. When, therefore, a polyphase circuit is connected to the magnet, as shown in Fig. 4, there is set up in the copper disc two torques, one due to the rotating field which in the arrangement shown in Fig. 1 will tend to rotate the disc in a clockwise direction, and the other due to the presence of the magnetic member and its cooperation with the individual magnets which in the arrangement shown is in a counterclockwise direction. The torque due to the rotating field normally predominates over the opposing torque which is due to the single phase energization, so that the disc will normally rotate in a clockwise direction, If, however, one phase of the polyphase circuit is opened, there will no longer be a rotating field and the single phase torque will then cause rotation in a counterclockwise direction.

The arrangement shown in Figs. 1 and 2 is for the purpose of interrupting the circuit upon the failure of one of its phases. We have accordingly provided the copper disc with a cam surface 22 forming a projection 23 which engages a stop 24 to prevent or limit the rotation of the disc due to the rotating field. Without this stop the disc would rotate continually in a clockwise direction. Upon the failure of the polyphase circuit due to opening one of the phases, the torque due to the single phase energization of the magnets will prevail and rotate the copper disc in a counterclockwise direction. When the disc rotates a portion of a revolution which, as shown, will be about three-quarters of a revolution, the cam surface 22 will engage a latch 25 to trip a circuit breaker 26 which in turn will open a main circuit breaker 27 and interrupt the polyphase circuit. With this arrangement it is only necessary that the two torques be in opposite directions, and we have, therefore, shown adjusting screw 28 for adjusting the magnitude of the opposing torque.

In Fig. 3 we have shown in detail the circuit breaker or tripping switch 26. This consists of a pivoted contact member 29 co-operating with the stationary contact member 30. A movable member is moved into engagement with the stationary member by a button 31 through toggle arms as shown. A spring 32 tends to move the switch arm 29 to open position while the latch 25 locks it in closed position. This is a well known form of construction and forms no part of our present invention.

As thus constructed and arranged, the operation of our device, as thus far described, is as follows: M represents an electric motor which is operated from a three-phase circuit A, a circuit breaker 27 having a no voltage release coil 33 being provided for automatically cutting off the three-phase circuit from the motor. Coils 10 to 13 are connected in pairs in two of the phases as shown. With the circuit breaker closed and all three phases connected to the motor, the copper disc 19 will rotate in a clockwise direction until it engages the stop. This will be the position shown in Fig. 4. If, however, one of the phases should be opened, the disc 19 will rotate in a counterclockwise direction, thereby opening the trip switch 26 which we have shown diagrammatically in Fig. 4. The disc will stop rotation in a counterclockwise direction as soon as the circuit is opened, thereby leaving the cam surface engaging with the latch so that the circuit breaker 26 cannot be latched closed until the three-phase circuit is supplied. If, therefore, the polyphase circuit should be opened, either while the motor is running or standing still the circuit will be immediately interrupted and cannot be closed unless the polyphase circuit is restored. Likewise, upon reversal of phase, it is obvious that the same thing will happen since in that case the torque due to the rotating field will immediately reverse and act in the same direction as the torque due to the single phase energization and immediately open the circuit. It will be noted that this will happen regardless of which phase is open. If the phase opens in which the coils are not connected the returning torque may be greater than as if one of the other phases should open, since in that case all four coils will be tending to return the disc. The torque, however, due to two coils is sufficient to return the disc, so that in any case the circuit will be opened.

In Fig. 5 we have shown a slight modification. In this case the rotating member is not utilized to interrupt a circuit but is merely the rotating member of an electric motor. We have, therefore, shown a magnetic member 35 which may be adjusted to both sides of the center so as to cause reverse rotation of the copper disc. It will be understood that when the magnetic member is on one side of the center the torque due to single phase energization will assist the torque due to the rotating field. When it is moved to the opposite side of the center, however, the single phase torque will oppose the rotating field torque, thereby making it possible to vary the speed. When used on single phase it will operate in either direction and at variable speeds. It will be seen that this will provide an electric motor which when operated on single phase may have its direction of rotation reversed and its speed varied merely by adjusting the magnetic member and without changing the circuit connections.

What we claim as new and desire to secure by Letters Patent of the United States, is:—

1. An electromagnetic device for alternating current circuits comprising an electromagnetic structure having windings associated therewith for producing a rotating field when the windings are energized by a polyphase circuit, a member rotated thereby and magnetic means controlling the flux of said structure for varying the direction and rate of rotation of the member, the said means being mounted for relative movement with respect to said member.

2. An electromagnetic device for alternating current circuits comprising an electromagnetic structure for producing a rotating field, a member rotated by said field and a magnetic element relatively movable with respect to said structure and said member and cooperating with the magnetic structure to set up another torque in said member which either assists or opposes the torque due to the said field depending upon the position of the element with respect to the said structure.

3. An electromagnetic device for alternating current circuits comprising an electromagnetic structure for producing a rotating field, a member rotated by the torque due to said field, a normally stationary magnetic element cooperating with the magnetic structure to set up another torque in said member, and means for adjusting the position of said element with reference to said member and said structure to vary the direction and rate of rotation of the member.

4. An electromagnetic device for alternating current circuits comprising a plurality of symmetrically disposed electromagnets for producing a rotating field, a member rotated by said field, and a stationary magnetic element having symmetrically disposed portions cooperating with the respective magnets to set up a torque in the said member which is independent of the torque due to the rotating field.

5. An electromagnetic device for alternating current circuits comprising a plurality of electromagnets for producing a rotating field, a member rotated by said field, and a magnetic element having portions cooperating with the magnets and adjustable with reference to said magnets and said member to set up a torque at each magnet, in addition to that due to the rotating field, of a strength and a direction depending upon the adjustment of said element.

6. An electromagnetic device for polyphase alternating current circuits comprising an electromagnetic structure for producing a rotating field when energized from the circuit, a non-magnetic, metallic disc rotated due to the torque set up by said field, and means adjustable with reference to said structure and relatively movable with respect to the said disc for setting up another torque in said disc which is independent of and persists after the disappearance of the said rotating field.

7. An electromagnetic device for alternating current circuits comprising an electromagnetic structure for producing a rotating field, a non-magnetic member rotated due to the torque set up by said field, and means adjustable with reference to the said structure and relatively movable with respect to the said disc for setting up another torque in said member which is independent of the rotating field and which rotates the said member at a speed and in a direction determined by the adjustment thereof when the torque set up by said field is not present.

8. An electromagnetic protective device for polyphase alternating current circuits comprising an electromagnetic structure energized from the polyphase circuit for producing a rotating field, a member rotated in one direction by said field, a magnetic element mounted for relative movement with reference to said member and said structure for causing a torque to be set up in said member tending to rotate it continuously in the opposite direction, the torque which is caused to be set up by said element being present to effect rotation of the said member in the said opposite direction upon the failure of a portion of the phases of said circuit and means for varying the position of said element to vary said latter torque.

9. An electromagnetic device for polyphase alternating current circuits comprising an electromagnetic structure including a plurality of pole pieces, a plurality of windings energized by said circuits to produce a rotating field, a non-magnetic, metallic disc in said field and rotated thereby, and a magnetic member relatively movable with respect to said disc and cooperating with said pole pieces and adjustable with reference thereto to vary the direction and the rate of rotation of said disc.

10. An electromagnetic device comprising a field structure energized by single phase current, magnetic means adjustable with reference to said structure for causing shifting poles in said structure and an armature rotated by said structure in either direction and at various speeds depending on the adjustment of said means.

11. An electromagnetic device comprising a field structure energized by single phase current, an armature rotated by said structure, a magnetic member cooperating with said structure to produce shifting poles therein, the said member being mounted for adjustment with respect to said structure and said armature to effect rotation of said armature in a direction and at a speed depending upon the position of said member.

12. An electromagnetic device comprising an electromagnetic structure including a plurality of pole pieces symmetrically disposed about a common axis and having windings thereon for producing a rotating field, a non-magnetic metallic member rotated in one direction due to the torque set up by said field, a magnetic element having a plurality of symmetrically disposed arms corresponding to the said poles and mounted for adjustment about the said axis independently of the said member for cooperating with the said poles to produce in said member another torque which varies in magnitude and direction depending on the adjustment of the element with respect to said poles and which persists to produce a rotation of said member after the failure of said field.

13. An electromagnetic device comprising windings arranged to be energized from a single phase source, a rotatable member under the influence of said windings, and a magnetic element cooperating with said member for causing a torque to be set up in the member, the said element being adjustable with reference to said member for determining the direction of the said torque to determine the direction of rotation of the member.

14. An electromagnetic device comprising windings arranged to be energized from a single phase source, a magnetic structure energized by said windings, the said structure having a plurality of definite poles, a rotatable member under the influence of the magnetic field set up by said windings, and a magnetic element cooperating with said member for causing a torque to be set up in the member by said magnetic field, the said element being adjustable with reference to said poles independently of said member to effect rotation of the member in either direction.

15. An electromagnetic device comprising series windings arranged to be energized in accordance with the current in the conductors of a source of supply, a magnetic structure energized by said windings, the said structure having a plurality of definite poles, a non-magnetic rotatable member under the the influence of the magnetic field set up by said windings, and a magnetic element mounted for limited independent rotation with respect to said member and cooperating with the member for causing to be set up in the member by said field, a torque which is adjusted in direction and value by adjusting the position of the element with reference to said poles.

In witness whereof, we have hereunto set our hands this 10th day of November, 1921.

BENJAMIN W. JONES.
NOBLE A. WOLFE.